(12) United States Patent
Watanabe

(10) Patent No.: US 8,689,847 B2
(45) Date of Patent: Apr. 8, 2014

(54) PNEUMATIC TIRE

(75) Inventor: Takeshi Watanabe, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 459 days.

(21) Appl. No.: 12/992,655

(22) PCT Filed: May 12, 2009

(86) PCT No.: PCT/JP2009/058851
§ 371 (c)(1),
(2), (4) Date: Dec. 29, 2010

(87) PCT Pub. No.: WO2009/142127
PCT Pub. Date: Nov. 26, 2009

(65) Prior Publication Data
US 2011/0088826 A1    Apr. 21, 2011

(30) Foreign Application Priority Data
May 20, 2008   (JP) .................................. 2008-132255

(51) Int. Cl.
*B60C 13/02*    (2006.01)
(52) U.S. Cl.
USPC ........................................................ 152/523
(58) Field of Classification Search
CPC ..................................................... B60C 13/02
USPC .......................................... 152/209.16, 523
See application file for complete search history.

(56) References Cited

U.S. PATENT DOCUMENTS

| | | | | |
|---|---|---|---|---|
| 1,458,629 A | * | 6/1923 | Raymond ..................... | 152/523 |
| 4,198,774 A | * | 4/1980 | Roberts et al. ................ | 40/587 |
| 4,926,918 A | * | 5/1990 | Demor et al. ................. | 152/154 |
| 5,303,758 A | * | 4/1994 | Clementz et al. ............. | 152/523 |
| 5,538,059 A | | 7/1996 | Brayer | |
| 6,533,007 B1 | | 3/2003 | McMannis | |
| 2009/0032161 A1 | | 2/2009 | Yamaguchi | |

FOREIGN PATENT DOCUMENTS

| | | |
|---|---|---|
| DE | 195 38 011 A1 | 4/1996 |
| DE | 10 2005 018 155 A1 | 10/2006 |
| EP | 2 055 507 A1 | 5/2009 |
| EP | 2233322 A1 | 9/2010 |
| JP | 2000-313209 | 11/2000 |
| JP | 2006-076431 A | 3/2006 |

(Continued)

OTHER PUBLICATIONS

English machine translation of Yamaguchi (JP2008-068716), dated Mar. 2008.*
European Search Report issued in European Application No. 09750489 dated May 6, 2011.
Korean Office Action dated Apr. 30, 2012 corresponding to Korean Patent Application No. 10-2010-7025923.

(Continued)

*Primary Examiner* — Justin Fischer
*Assistant Examiner* — Robert Dye
(74) *Attorney, Agent, or Firm* — Sughrue Mion, PLLC

(57) ABSTRACT

The aspect of the present invention is a pneumatic tire comprising a plurality of radial protrusions 60 each extending in a tire radial direction on a tire surface 31 and having a shape protruding from the tire surface outward in a tire width direction, wherein the plurality of radial protrusions 60 are provided radially with a tire rotation axis as a center, the plurality of radial protrusions 60 each have a low protrusion portion 63 and a high protrusion portion 64, and a height of the low protrusion portion measured in the tire width direction hs is lower than a maximum height of the high protrusion portion h measured in the tire width direction.

7 Claims, 16 Drawing Sheets

(56) References Cited

FOREIGN PATENT DOCUMENTS

| | | |
|---|---|---|
| JP | 2008-068716 | 3/2008 |
| JP | 2009-029383 A | 2/2009 |
| WO | 2007/032405 A1 | 3/2007 |

OTHER PUBLICATIONS

International Search Report dated Jul. 14, 2009.
European Office Action dated Mar. 13, 2013, issued in corresponding European Application No. 09750489.8.

* cited by examiner

TIRE ROTATION DIRECTION (a)

(b)

(c)

PNEUMATIC TIRE

TECHNICAL FIELD

The present invention relates to a pneumatic tire provided with multiple radial protrusions extending in a tire radial direction on a tire surface thereof.

BACKGROUND ART

Generally, a rise in the temperature of a pneumatic tire promotes a time-dependent change in a material constituting the pneumatic tire. An example of the time-dependent change in the material is a change in properties. The temperature rise in the pneumatic tire can also cause damage in a tread portion at high-speed driving. For those reasons, the temperature rise in the pneumatic tire is not desirable in terms of the durability of the pneumatic tire.

An improvement in the durability is important particularly for an off-the-road radial tire (ORR) and a truck and bus radial tire (TBR) that receive a heavy load, as well as a run-flat tire running flat (running with a tire internal pressure of 0 kPa). Accordingly, it is important for these pneumatic tires to have a reduced temperature rise.

For example, the run-flat tire is provided with sidewall reinforcing layers for reinforcing tire side portions. The sidewall reinforcing layers each have a crescent shape in a cross section taken in a tire width direction. When the run-flat tire runs flat, deformation in a tire radial direction concentrates on the sidewall reinforcing layers. Thereby, the sidewall reinforcing layers have an increased temperature, consequently deteriorating the durability of the run-flat tire.

On the other hand, there has been proposed a technique in which reinforcing members for suppressing deformation of the pneumatic tire are provided to a carcass layer and bead portions (called a first technique below) (e.g., Patent Literature 1). In the first technique, the reinforcing members for suppressing deformation in side portions are provided particularly to the carcass layer and the bead portions that constitute the tire side portions. Thereby, the temperature rise in the pneumatic tire, or particularly, the temperature rise in the tire side portions can be suppressed.

There is known a technique in which a rim guard having many ridges is provided outside, in the tire width direction, of each bead portion adjacent to a rim (called a second technique below). The surface area of the pneumatic tire is increased by the many ridges provided to the rum guard, improving the radiation performance of heat generated in the pneumatic tire.

CITATION LIST

Patent Literature

Patent Literature 1: Japanese Patent Application Publication No. 2006-76431

SUMMARY OF INVENTION

In the first technique described above, a load applied to the pneumatic tire might lead to a separation of the reinforcing members. In other words, the reinforcing member might be a factor for other damage.

Moreover, the reinforcing members provided to the tire side portions improve the rigidity of the tire side portions, and therefore make the pneumatic tire more bouncy. This consequently might degrade the steering stability, ride quality, and the like. The run-flat tire, in particular, has high rigidity in the tire side portions; therefore, the ride quality and the like might be degraded.

As described, the intention of the second technique described above is to improve the radiation performance by increasing the surface area of the pneumatic tire. Meanwhile, the outer surface of the pneumatic tire is preferably made of a rubber material having low heat conductivity such as to prevent conduction of friction heat generated between the pneumatic tire and the road surface. Accordingly, the temperature rise in the tire side portions cannot be sufficiently suppressed by simply increasing the surface area of the pneumatic tire.

The present invention has been made to solve the above problems, and has an objective of providing a pneumatic tire capable of sufficiently suppressing the temperature rise in the tire side portions.

To solve the above problems, the present invention has the following aspects. The first aspect of the present invention is summarized as comprising a plurality of radial protrusions (radial protrusions 60) each extending in a tire radial direction on a tire surface (a tire surface 31) and having a shape protruding from the tire surface outward in a tire width direction, wherein the plurality of radial protrusions are provided radially with a tire rotation axis as a center, the plurality of radial protrusions each have a low protrusion portion (a low protrusion portion 63) and a high protrusion portion (a high protrusion portion 64), and a height of the low protrusion portion measured in the tire width direction (a low-protrusion height hs) is lower than a maximum height of the high protrusion portion measured in the tire width direction (a high-protrusion height h).

According to the above aspect, the pneumatic tire has the multiple radial protrusions protruding from the tire surface outward in the tire width direction. Accordingly, airflow crosses over the radial protrusion and then flows toward the tire surface in the direction substantially perpendicular thereto at a position behind the radial protrusion in the tire rotation direction. The airflow having flown toward the tire surface in the direction substantially perpendicular thereto then collides heavily with the tire surface. Accordingly, the airflow and the tire surface actively exchange heat with each other, sufficiently suppressing the temperature rise in the tire side portion (the tire surface). Thereby, the tire durability improves.

The circumference is longer on the outer side in the tire radial direction than on the inner side in the tire radial direction. Accordingly, in the tire side portion, airflow flowing on an inner side, in the tire radial direction, of the point corresponding to the tire maximum width (inner airflow) travels slower than air flowing on an outer side, in the tire radial direction, of the point corresponding to the tire maximum width (outer airflow).

Accordingly, the inner airflow is pulled by the outer airflow and is directed outward in the tire radial direction by the centrifugal force. Specifically, the closer to the tire rotation axis, the larger the inclination angle of airflow with respect to the tangent to the tire circumference. In other words, the inner airflow has a larger radial component directed in the tire radial direction and a smaller circumferential component directed in the tire circumferential direction than the outer airflow does.

The pneumatic tire has a shape with a curvature in a cross section taken in the tire width direction. Accordingly, the inner airflow having a large radial component is easily separated from the tire surface (or easily moves away from the tire surface) in the tire radial direction.

With this taken into consideration, the radial protrusion has the low protrusion portion and the high protrusion portion.

Accordingly, the inner airflow having a large radial component can cross over the low protrusion portion more easily than in a case where the radial protrusion has a constant height. The airflow having crossed over the low protrusion portion flows toward the tire surface in the direction substantially perpendicular thereto at a position behind (downstream of) the low protrusion portion in the tire rotation direction.

Accordingly, the inner airflow having a large radial component is not easily separated from the tire surface. As a result, the airflow is retained on the tire surface, so that the airflow and the tire surface can actively exchange heat with each other.

Another aspect is summarized as the low protrusion portion is provided to the tire surface in a tire maximum width (a tire maximum width TW) portion in the tire width direction (a maximum width portion T).

The other aspect is summarized as further comprising a circular circumferential protrusion (a circular circumferential protrusion 100) extending along a circumference which has the tire rotation axis as a center, and having a shape protruding from the tire surface outward in the tire width direction, wherein part of the circular circumferential protrusion constitutes the low protrusion portion of each of the plurality of radial protrusions.

The other aspect is summarized as the height of the low protrusion portion measured in the tire width direction is 0.2 times to 0.8 times, both inclusive, of the maximum height of the high protrusion portion measured in the tire width direction.

The other aspect is summarized as a length of the low protrusion portion measured in the tire radial direction (low-protrusion length B) is 2 mm to 22 mm, both inclusive.

The other aspect is summarized as each of the plurality of radial protrusions has inclined faces (inclined faces 65) each being continuous with a top face of the high protrusion portion and with a top face of the low protrusion portion, and an angle formed between the inclined face and the top face of the low protrusion portion is an obtuse angle.

The other aspect is summarized as each of the plurality of radial protrusions has inclined faces each being continuous with a top face of the high protrusion portion and with a top face of the low protrusion portion, and a border between the top face of the high protrusion portion and the inclined face is round.

The other aspect is summarized as each of the plurality of radial protrusions has inclined faces each being continuous with a top face of the high protrusion portion and with a top face of the low protrusion portion, and a border between the top face of the low protrusion portion and the inclined face is round.

The other aspect is summarized as each of the plurality of radial protrusions has wall faces each being continuous with a top face of the high protrusion portion and with a top face of the low protrusion portion, and the wall face forms a substantially right angle with respect to the top face of the high protrusion portion and to the top face of the low protrusion portion.

The other aspect is summarized as the plurality of radial protrusions have a relation of $1.0 \leq p/h \leq 50.0$ and $1.0 \leq (p-w)/w \leq 100.0$, where "h" is a maximum height of the high protrusion portion, "w" is a width of each radial protrusion measured in a direction perpendicular to the tire radial direction, and "p" is a pitch between the adjacent radial protrusions.

The present invention can provide a pneumatic tire capable of sufficiently suppressing the temperature rise in the tire side portions.

DESCRIPTION OF EMBODIMENTS

Examples of a pneumatic tire according to the present invention will be described with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

[First Embodiment]

(Configuration of a Pneumatic Tire)

Figure 1:
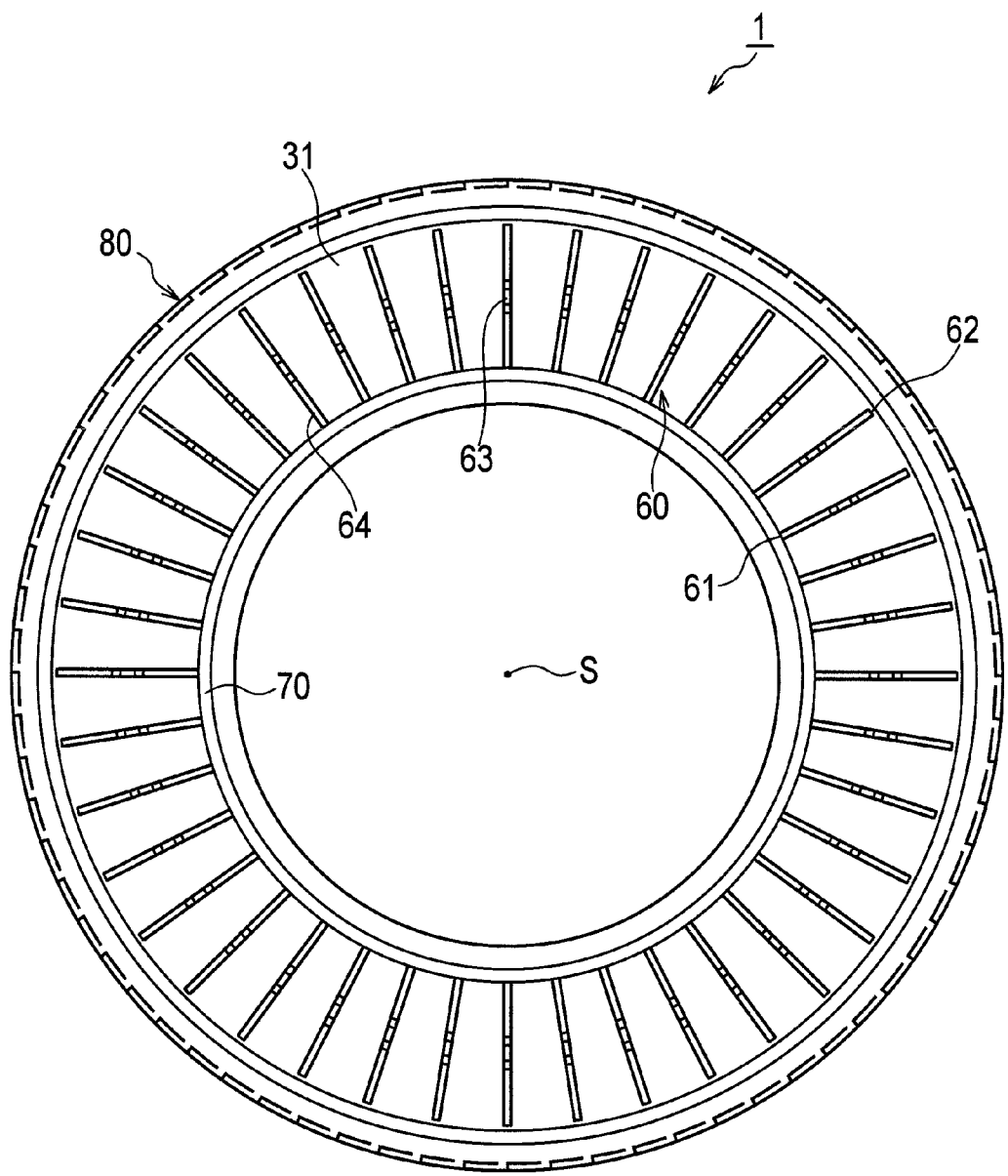
FIG. 1 is a side view of a pneumatic tire according to a first embodiment.
Figure 2:
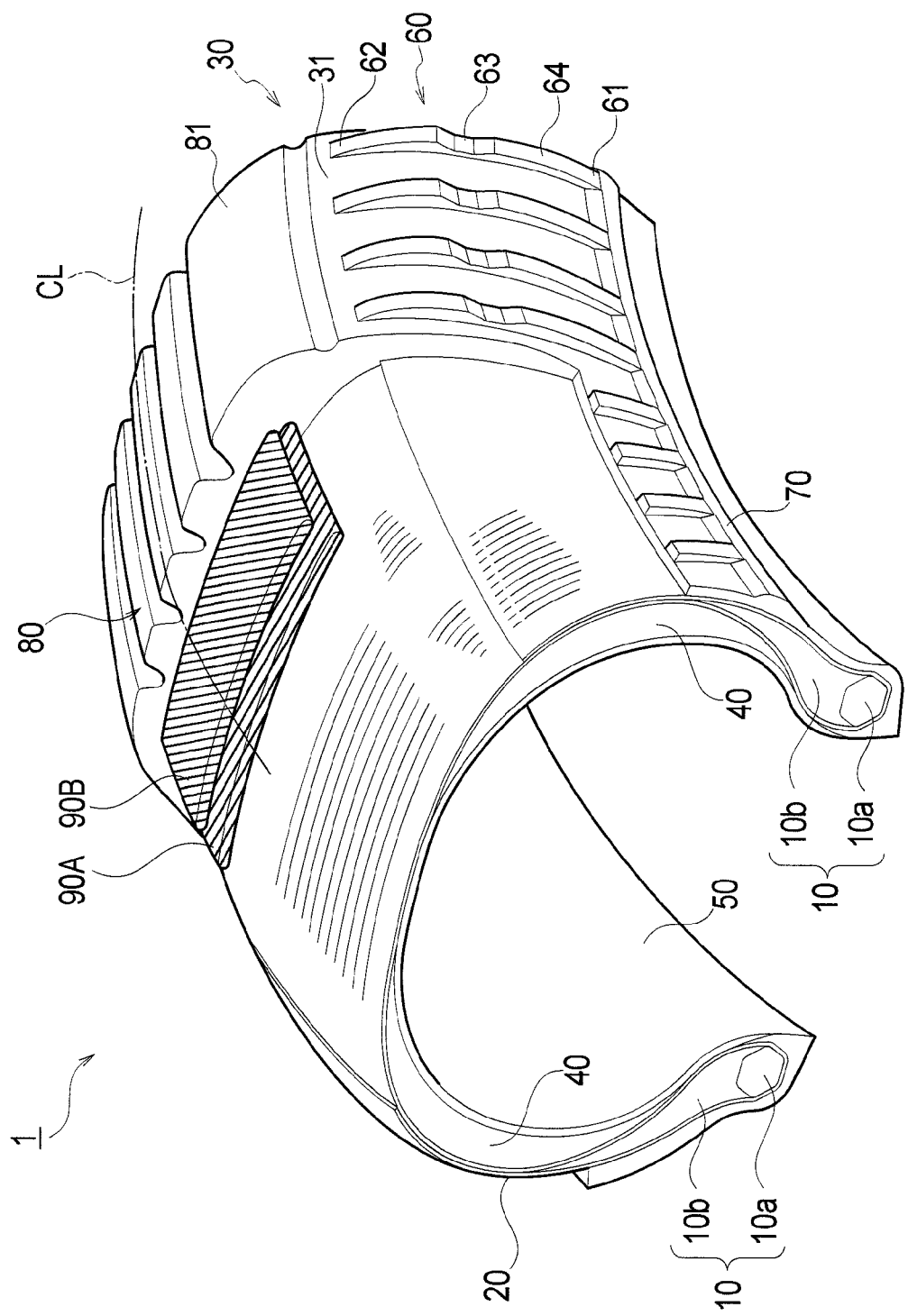
FIG. 2 is a partial cross-sectional perspective view of the pneumatic tire according to the first embodiment.
Figure 3:
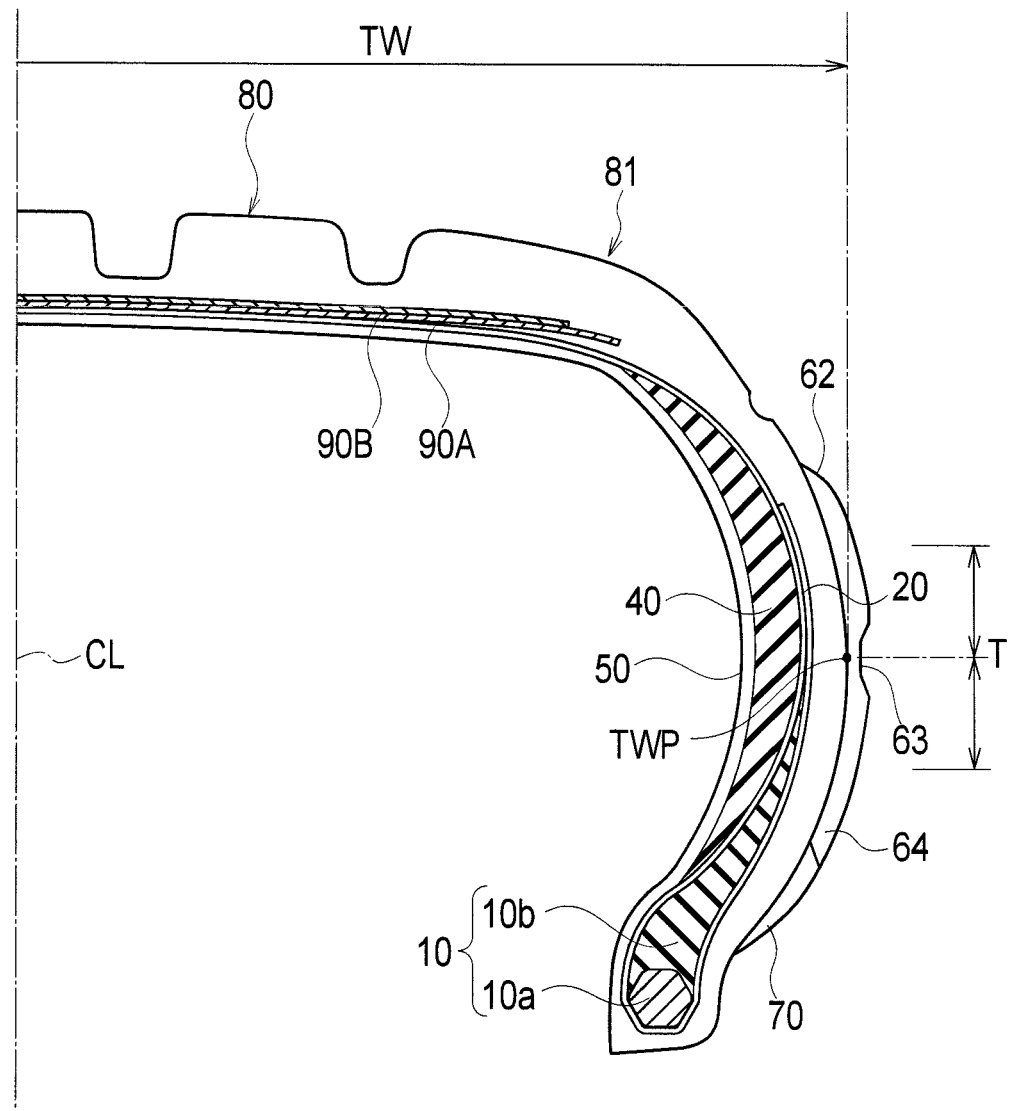
FIG. 3 is a cross-sectional view of the pneumatic tire according to the first embodiment, taken in a tire width direction.

The configuration of a pneumatic tire according to a first embodiment is described with reference to the drawings. FIG. 1 is a side view of the pneumatic tire according to the first embodiment. FIG. 2 is a partial cross-sectional perspective view of the pneumatic tire according to the first embodiment. FIG. 3 is a cross-sectional view, taken in a tire width direction, of the pneumatic tire according to the first embodiment.

As FIGS. 1 to 3 show, a pneumatic tire 1 includes paired bead portions 10 and a carcass layer 20. The paired bead portions 10 each include at least a bead core 10a and a bead filler 10b. In the tire width direction, the carcass layer 20 is provided between the paired bead cores 10a to make a toroidal shape and is folded from an inner side, in the tire width direction, of each bead core 10a to an outer side, in the tire width direction, of the bead core 10a along the outer circumference of the bead core 10a.

In a cross section taken in the tire width direction, crescent-shaped side reinforcing layers 40, made of rubber stock, are provided on an inner side of the carcass layer 20 to reinforce tire side portions 30, respectively. Note that each tire side portion 30 is provided between one of edge portions, namely tread shoulders 81, of a tread portion 80 to be described later and the corresponding bead portion 10.

An inner liner 50 is provided on an inner side, in the tire width direction, of the side reinforcing layers 40. The inner liner 50 is a rubber layer corresponding to a tube and having high air tightness. Radial protrusions 60 extending straight in a tire radial direction are provided on an outer side, in the tire width direction, of each of the carcass layer 20, namely, on a surface of each of the tire side portions 30 (called a tire surface 31 hereinbelow). The radial protrusions 60 each have a shape protruding from the tire surface 31 outward in the tire width direction. The multiple radial protrusions 60 are provided radially with a tire rotation axis S as the center. Note that details of the radial protrusions 60 will be described later.

A rim guard 70 is provided on an outer side, in the tire width direction, of the carcass layer 20 near the corresponding bead portion 10. The rim guard 70 has a shape protruding from the tire surface 31 outward in the tire width direction.

The tread portion 80 to be in contact with a road surface is provided on an outer side, in the tire radial direction, of the carcass layer 20. Between the carcass layer 20 and the tread portion 80, a first belt layer 90A and a second belt layer 90B are provided on an inner side in the tire radial direction and on an outer side in the tire radial direction, respectively.

(Configuration of the Radial Protrusions)

Figure 4:
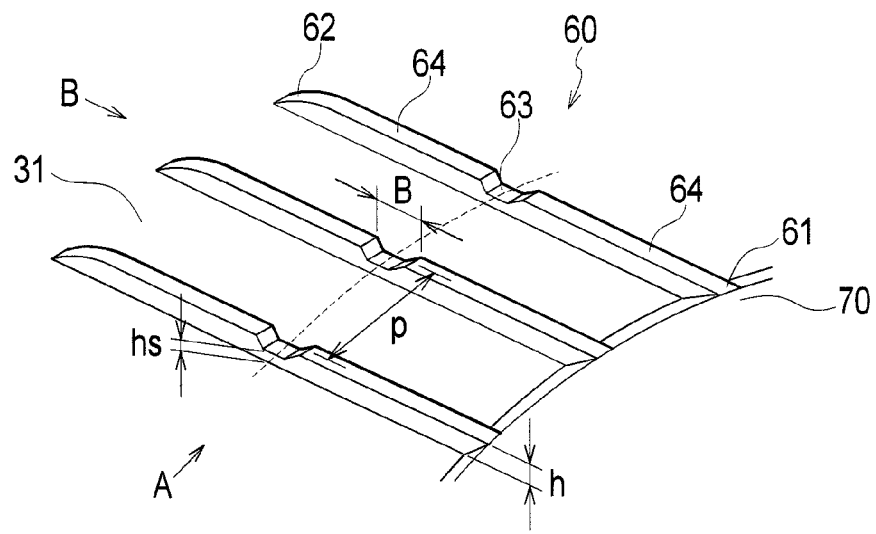
FIG. 4 is a perspective view of radial protrusions according to the first embodiment.
Figure 5:
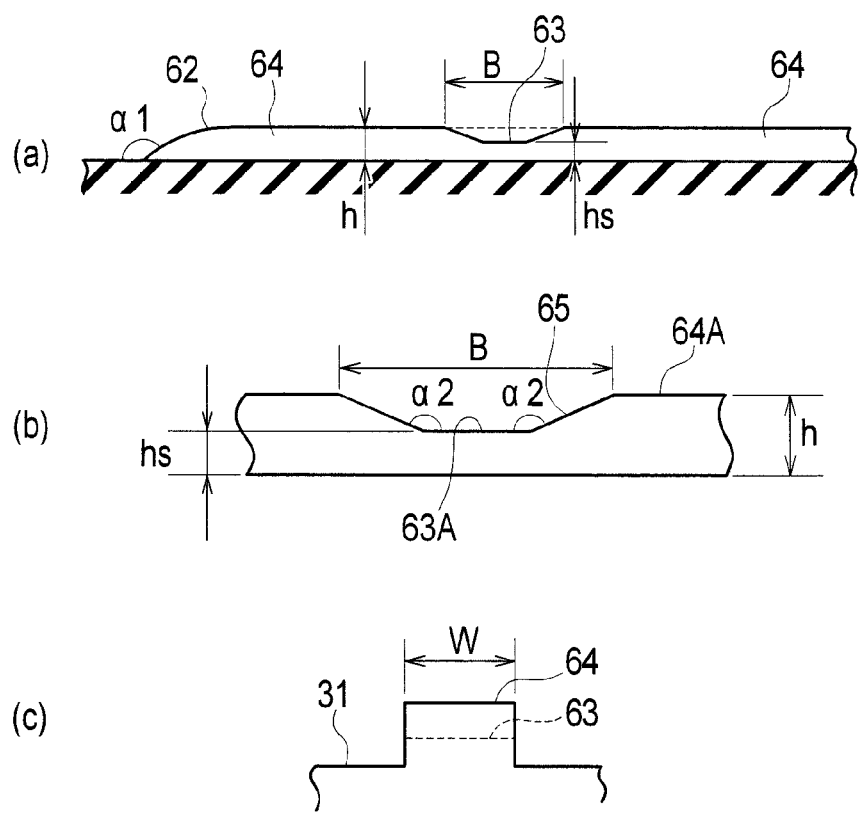
FIG. 5 is a diagram of radial protrusions according to the first embodiment.

Next, the configuration of the radial protrusions 60 described above is described with reference to the drawings. FIG. 4 is a perspective view of the radial protrusions according to the first embodiment. FIG. 5 shows the radial protrusion according to the first embodiment.

Part (a) of FIG. 5 is a diagram, viewed in the direction of Arrow A in FIG. 4, showing the radial protrusion according to the first embodiment. Part (b) of FIG. 5 is a diagram, viewed in the direction of Arrow B in FIG. 4, showing the radial protrusion according to the first embodiment.

As FIGS. 4 and 5 show, each of the multiple radial protrusions 60 is formed to be substantially rectangular in a cross section taken in a direction substantially perpendicular to the tire radial direction (i.e., to the extending direction of the protrusion). The multiple radial protrusions 60 each have an inner end portion 61 being an end portion located at an inner side thereof in the tire radial direction and an outer end portion 62 being an end portion located at an outer side thereof in the tire radial direction.

The inner end portion 61 continues smoothly into the surface of the rim guard 70. The outer end portion 62, on the other hand, inclines to continue smoothly into the tire surface 31. The outer end portion 62 has an end face 62A at its outer side in the tire radial direction. The end face 62A inclines ($\alpha 1$) with respect to the tire surface 31. A border between a top face 60A and the end face 62A of the radial protrusion 60 is round.

As FIGS. 4 and 5 show, each of the multiple radial protrusions 60 includes a low protrusion portion 63 and a high protrusion portion 64. The low protrusion portion 63 is provided in a portion corresponding to a tire maximum width TW in the tire width direction (called a maximum width portion T hereinbelow) in the tire surface 31. The maximum width portion T refers to a range of 10 mm on each of outer and inner sides, in the tire radial direction, of a point TWP corresponding to the tire maximum width TW (see FIG. 3).

Specifically, the height of the low protrusion portion 63 measured in the tire width direction (called a low-protrusion height hs) is smaller than the maximum height of the high protrusion portion 64 measured in the tire width direction (called a high-protrusion height h). The low-protrusion height hs is preferably 0.2 times to 0.8 times, both inclusive, of the high-protrusion height h.

When the low-protrusion height hs is 0.2 times or more of the high-protrusion height h, airflow flowing on the maximum width portion T crosses over the low protrusion portion. The airflow having crossed over the low protrusion portion then flows toward the tire surface in a direction substantially perpendicular thereto at a position behind (downstream of) the low protrusion portion in the tire rotation direction. Accordingly, the airflow flowing on the maximum width portion T is prevented from being separated from the tire surface 31. Thereby, the temperature rise in the tire side portion 30 is sufficiently suppressed. When, on the other hand, the low-protrusion height hs is 0.8 times or less of the high-protrusion height h, the low-protrusion height hs is not larger than the high-protrusion height h. Accordingly, airflow flowing on the maximum width portion T easily crosses over the low protrusion portion rather than the high protrusion portion. Consequently, airflow flowing on the maximum width portion T is prevented from being separated from the tire surface 31.

Each of the multiple radial protrusions 60 has inclined faces 65 each being continuous with a top face 64A of the high protrusion portion 64 and with a top face 63A of the low protrusion portion 63. An angle formed between the inclined face 65 and the top face 63A of the low protrusion portion 63 is an obtuse angle ($\alpha 2$).

The length of the low protrusion portion 63 measured in the tire radial direction (called a low-protrusion length B) is preferably 2 mm to 22 mm, both inclusive. The low-protrusion length B corresponds to a portion excluding the high protrusion portion 64. In other words, the low-protrusion length B includes the length of the inclined faces 65 measured in the tire radial direction.

When the low-protrusion length B is 2 mm or larger, airflow flowing toward the tire surface 31 in the direction substantially perpendicular thereto (so-called downflow) is generated at a position behind (downstream of) the low protrusion portion 63 in the tire rotation direction. Thereby, the temperature rise in the tire side portion 30 (the tire surface 31) is sufficiently suppressed. When, on the other hand, the low-protrusion length B is 22 mm or smaller, the high protrusion portion 64 is provided with enough area. Accordingly, the temperature rise in the tire side portion 30 other than the maximum width portion T is sufficiently suppressed.

The high-protrusion height h is preferably 0.5 mm to 7 mm, both inclusive. It is particularly preferable that the high-protrusion height h be 0.5 mm to 3 mm, both inclusive.

When the high-protrusion height h is 0.5 mm or larger, airflow crosses over the radial protrusion 60 and flows toward the tire surface 31 in a direction substantially perpendicular thereto. Airflow flowing toward the tire surface 31 in the direction substantially perpendicular thereto (so-called downflow) collides heavily with the tire surface 31 at a position between the radial protrusions 60, so that the airflow and the tire surface 31 can actively exchange heat with each other. Thereby, the temperature rise in the tire side portion 30 can be efficiently suppressed. On the other hand, when the high-protrusion height h is 7 mm or smaller, the radial protrusions 60 can be provided with enough rigidity. This can further improve the durability of the radial protrusions 60.

The width of each radial protrusion 60 measured in a direction substantially perpendicular to the tire radial direction (to the extending direction of the protrusion) (called a protrusion width w) is constant in the tire radial direction. The protrusion width w is preferably 0.3 mm to 4 mm, both inclusive. It is particularly preferable that the protrusion width w be 0.5 mm to 3 mm, both inclusive.

When the protrusion width w is 0.3 mm or larger, the radial protrusion 60 can be provided with enough rigidity. This further improves the durability of the radial protrusion 60. When, on the other hand, the protrusion width w is 4 mm or smaller, the internal temperature of (the temperature of heat accumulated in) the radial protrusion 60 is further decreased. Thereby, the temperature rise in the tire side portion 30 can be efficiently suppressed.

Figure 6:
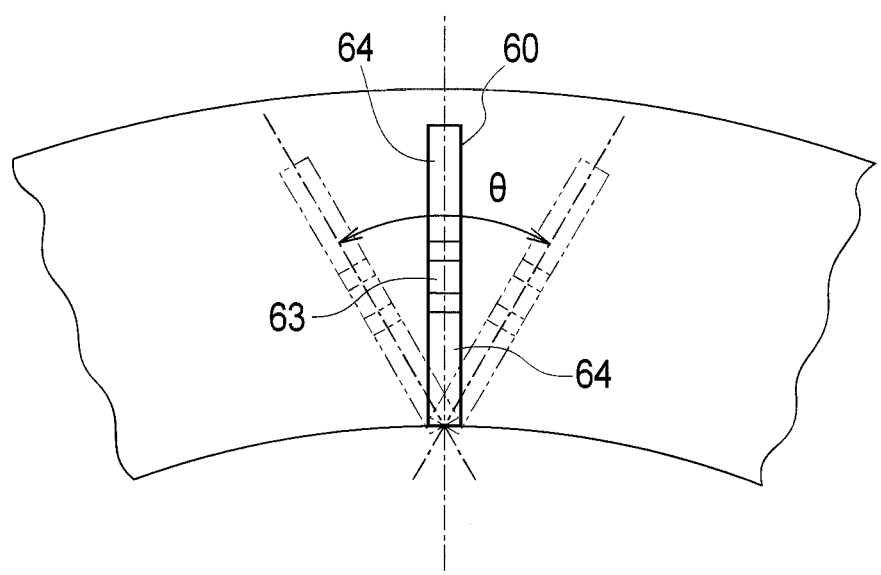
FIG. 6 is an enlarged side view of the radial protrusion according to the first embodiment.

Next, the extending direction of the radial protrusion 60 is described with reference to a drawing. FIG. 6 is an enlarged side view of the radial protrusions according to the first embodiment.

As FIG. 6 shows, an angle between the tire radial direction and the direction in which the radial protrusion 60 extends (an extending-direction angle θ) is preferably set within a range of $-70° \leq \theta \leq 70°$.

In the pneumatic tire 1, the circumference is longer on an outer side in the tire radial direction than on an inner side in the tire radial direction. Accordingly, airflow flowing on the inner side in the tire radial direction (inner airflow) travels slower than airflow flowing on the outer side in the tire radial direction (outer airflow). For this reason, the inner airflow is pulled by the outer airflow and is directed outward in the tire radial direction by the centrifugal force.

When the extending-direction angle (θ) is set within the above range, airflow flowing toward the tire surface 31 in the direction substantially perpendicular thereto (so-called downflow) is generated at a position behind (downstream of) the low protrusion portion 63 in a tire rotation direction. As a result, the temperature rise in the tire side portion 30 can be efficiently suppressed.

Figure 7:
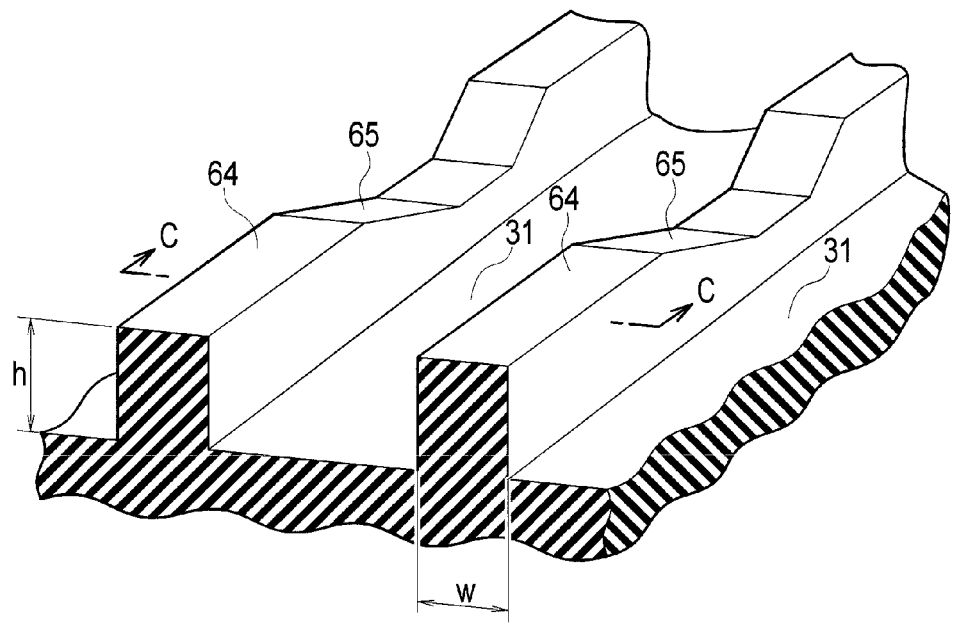
FIG. 7 is a partial perspective view of the radial protrusions according to the first embodiment.
Figure 8:
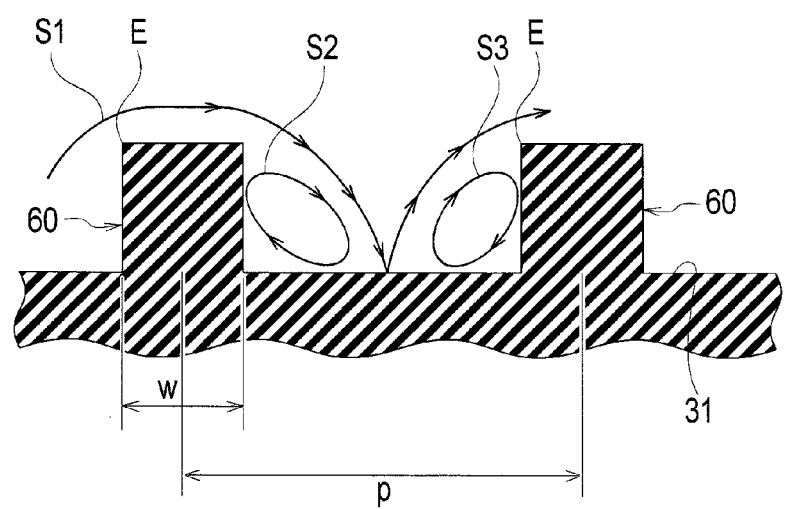
FIG. 8 is a cross-sectional view of the radial protrusions according to the first embodiment (taken along a C-C line in FIG. 7).

Next, a relation between the radial protrusions 60 adjacent to each other in a tire circumferential direction is described with reference to the drawings. FIG. 7 is a partial perspective view of the radial protrusions according to the first embodiment. FIG. 8 is a cross-sectional view of the radial protrusions according to the first embodiment (taken in the C-C line in FIG. 7).

As FIGS. 7 and 8 show, the radial protrusions 60 are preferably provided with a relation of $1.0 \leq p/h \leq 50.0$ and $1.0 \leq (p-w)/w \leq 100.0$, where "h" is the maximum height of the high protrusion portion, "w" is the width of the radial protrusion 60 measured in a direction perpendicular to the tire radial direction, and "p" is the pitch between the radial protrusions 60 adjacent to each other. The pitch p indicates a distance between the center of the protrusion width w of one low protrusion portion 63 and the center of the protrusion width w of an adjacent low protrusion portion 63, the distance being measured at the point TWP corresponding to the tire maximum width TW.

It is particularly preferable that the radial protrusions 60 be provided with a relation of $2.0 \leq p/h \leq 24.0$ and $4.0 \leq (p-w)/w \leq 39.0$. It is even more preferable that the radial protrusions 60 be provided with a relation of $10.0 \leq p/h \leq 20.0$ and $4.0 \leq (p-w)/w \leq 39.0$.

When the ratio of the pitch p to the high-protrusion height h (p/h) is larger than 1.0, air crossing over the radial protrusion 60 and then flowing toward the tire surface 31 in the direction substantially perpendicular thereto (so-called downflow) heavily collides with the tire surface 31 easily at a position between the radial protrusions 60. Consequently, the temperature rise in the tire side portion 30 is further suppressed. On the other hand, when the ratio of the pitch p to the high-protrusion height h (p/h) is smaller than 50.0, air crossing over the radial protrusion 60 and then flowing toward the tire surface 31 in the direction substantially perpendicular thereto (so-called downflow) is generated more with respect to the radiation area. As a result, the temperature rise in the tire side portion 30 is further suppressed.

When the ratio of a difference between the pitch p and the protrusion width w to the protrusion width w ((p-w)/w) is larger than 1.0, the radiation area is larger than the surface areas (top faces 60A) of the radial protrusions 60. As a result, the temperature rise in the tire side portion 30 is suppressed. On the other hand, when the ratio of the difference between the pitch p and the protrusion width w to the protrusion width w ((p-w)/w) is smaller than 100.0, air crossing over the radial protrusion 60 and then flowing toward the tire surface 31 in the direction substantially perpendicular thereto (so-called downflow) is generated more than in a case where ((p-w)/w) is larger than 100.0. As a result, the temperature rise in the tire side portion 30 is further suppressed.

(Flow of Air)

Figure 9:
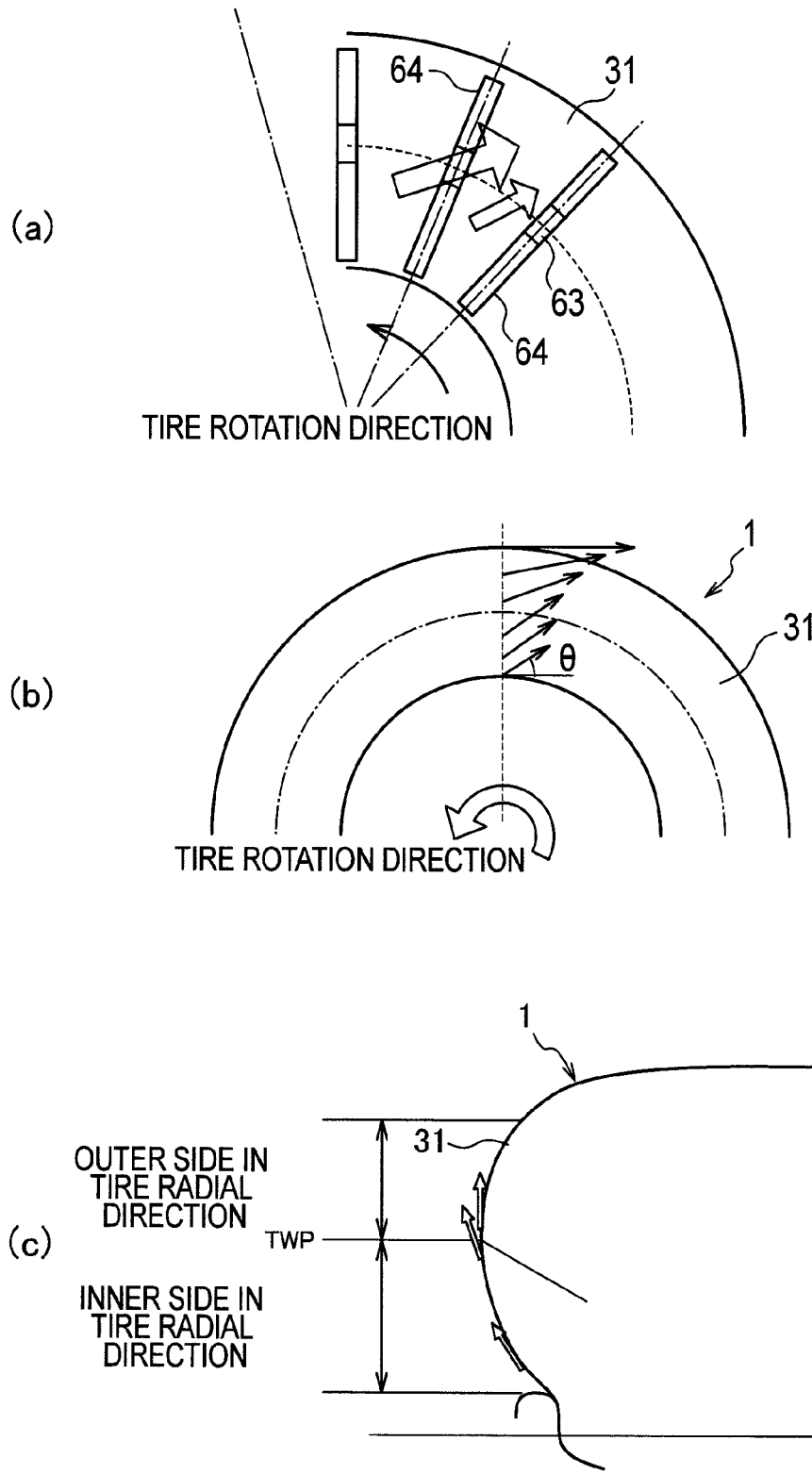
FIG. 9 shows diagrams illustrating flow of air crossing over the radial protrusions 60 according to the first embodiment.

Next, flow of air crossing over the radial protrusions 60 according to the first embodiment is described with reference to a drawing. FIG. 9 is a diagram illustrating flow of air crossing over the radial protrusions 60 according to the first embodiment.

As part (a) of FIG. 9 shows, in the tire side portion 30, airflow flowing on an inner side, in the tire radial direction, of the point TWP corresponding to the tire maximum width TW (inner airflow) travels slower than air flowing on an outer side, in the tire radial direction, of the point TWP corresponding to the tire maximum width TW (outer air). This is because the circumference is longer on the outer side in the tire radial direction than on the inner side in the tire radial direction.

Accordingly, as part (b) of FIG. 9 shows, the inner airflow is pulled by the outer airflow and is directed outward in the tire radial direction by the centrifugal force. Specifically, the closer to the tire rotation axis S, the larger an inclination angle θ of airflow with respect to the tangent to the tire circumference. In other words, the inner airflow has a larger radial component directed in the tire radial direction and a smaller circumferential component directed in the tire circumferential direction than the outer airflow does.

As part (c) of FIG. 9 shows, the pneumatic tire 1 has a shape with a curvature in a cross section taken in the tire width direction. Accordingly, the inner airflow having a large radial component is easily separated from the tire surface 31 (or easily moves away from the tire surface 31) in the tire radial direction.

With this taken into consideration, the radial protrusion 60 has the low protrusion portion 63 and the high protrusion portion 64. The low protrusion portion 63 is provided in the maximum width portion T. Accordingly, the inner airflow having a large radial component can cross over the low protrusion portion 63 more easily than in a case where the radial protrusion 60 has a constant height. The airflow having crossed over the low protrusion portion 63 flows toward the tire surface 31 in the direction substantially perpendicular thereto at a position behind (downstream of) the low protrusion portion 63 in the tire rotation direction (i.e., becomes so-called downflow).

Accordingly, the inner airflow having a large radial component is not easily separated from the tire surface 31. In other words, airflow flowing on the maximum width portion T is easily attached to the tire surface 31 at a position near the tire maximum width TW.

On the other hand, airflow having a circumferential component crosses over multiple radial protrusions 60. Specifically, as FIG. 8 shows, airflow S1 generated by the rotation of the pneumatic tire 1 is separated from the tire surface 31 by the radial protrusions 60. The airflow S1 separated from the tire surface 31 crosses over an edge portion E of the radial protrusion 60 located on a front side of the radial protrusion 60 in the tire rotation direction. The airflow S1 having crossed over the radial protrusion 60 flows toward the tire surface 31 in the direction substantially perpendicular thereto at a position behind the radial protrusion 60 in the tire rotation direction (i.e., becomes so-called downflow). Then, the airflow 51 collides heavily with the tire surface 31, and travels toward the adjacent radial protrusion 60.

In this event, fluid S2 staying behind the radial protrusion 60 in the tire rotation direction draws heat staying there and joins the airflow S1. On the other hand, fluid S3 staying before the adjacent radial protrusions 60 in the tire rotation direction draws heat staying there and joins the airflow S1, as well.

As described, the airflow S1 flows toward the tire surface 31 in the direction substantially perpendicular thereto at a position behind the radial protrusion 60 in the tire rotation direction, and then collides heavily with the tire surface 31.

Further, the fluid S2 and the fluid S3 having drawn heat join the airflow S1. Accordingly, the airflow S1 and the tire surface 31 actively exchange heat with each other, decreasing the temperature rise in the tire side portions 30 in a large area.
(Advantageous Effects)

In the first embodiment, the pneumatic tire 1 includes the multiple radial protrusions 60 protruding from the tire surface 31 outward in the tire width direction. Accordingly, the airflow S1 crosses over the radial protrusion 60 and then flows toward the tire surface 31 in the direction substantially perpendicular thereto at a position behind the radial protrusion 60 in the tire rotation direction. Then, the airflow S1 collides heavily with the tire surface 31. Accordingly, the airflow S1 and the tire surface 31 actively exchange heat with each other, sufficiently suppressing the temperature rise in the tire side portion 30 (the tire surface 31). Thereby, the tire durability improves.

The circumference is longer on the outer side in the tire radial direction than on the inner side in the tire radial direction. Accordingly, in the tire side portion 30, airflow flowing on an inner side, in the tire radial direction, of the point TWP corresponding to the tire maximum width TW (inner airflow) travels slower than air flowing on an outer side, in the tire radial direction, of the point TWP corresponding to the tire maximum width TW (outer airflow).

Accordingly, the inner airflow is pulled by the outer airflow and is directed outward in the tire radial direction by the centrifugal force. Specifically, the closer to the tire rotation axis S, the larger the inclination angle θ of airflow with respect to the tangent to the tire circumference. In other words, the inner airflow has a larger radial component directed in the tire radial direction and a smaller circumferential component directed in the tire circumferential direction than the outer airflow does.

The pneumatic tire 1 has a shape with a curvature in a cross section taken in the tire width direction. Accordingly, the inner airflow having a large radial component is easily separated from the tire surface 31 (or easily moves away from the tire surface 31) in the tire radial direction.

With this taken into consideration, in the first embodiment, the radial protrusion 60 has the low protrusion portion 63 and the high protrusion portion 64. Accordingly, the inner airflow having a large radial component can cross over the low protrusion portion 63 more easily than in a case where the radial protrusion 60 has a constant height. The airflow having crossed over the low protrusion portion 63 flows toward the tire surface 31 in the direction substantially perpendicular thereto at a position behind (downstream of) the low protrusion portion 63 in the tire rotation direction (i.e., becomes so-called downflow).

Accordingly, the inner airflow having a large radial component is not easily separated from the tire surface 31. As a result, the airflow is retained on the tire surface 31, so that the airflow 51 and the tire surface 31 can actively exchange heat with each other.

Further, the inner airflow having a large radial component (i.e., airflow flowing on the maximum width portion) is most easily separated from the tire surface (moves away from the tire surface).

With this taken into consideration, in the first embodiment, the low protrusion portion is provided in the portion corresponding to the tire maximum width measured in the tire width direction (the tire maximum width TW) (namely, the maximum width portion T) in the tire surface. The inner airflow having a large radial component (i.e., airflow flowing on the maximum width portion) crosses over the low protrusion portion more easily than it crosses over the high protrusion portion. The airflow having crosses over the low protrusion portion flows toward the tire surface in the direction substantially perpendicular thereto at a position behind (downstream of) the low protrusion portion in the tire rotation direction. Accordingly, the inner airflow having a large radial component is not easily separated from the tire surface. In other words, airflow flowing on the maximum width portion is easily attached to the tire surface near a portion corresponding to the tire maximum width. As a result, airflow flowing on the maximum width portion is retained on the tire surface, so that the airflow and the tire surface can actively exchange heat with each other.

In the first embodiment, the low-protrusion height hs is 0.2 times to 0.8 times, both inclusive, of the high-protrusion height h. The low-protrusion length B is 2 mm to 22 mm, both inclusive. Accordingly, the airflow S1 flowing on the maximum width portion T is retained on the tire surface 31. Consequently, the airflow S1 and the tire surface 31 can actively exchange heat with each other.

In the first embodiment, the high-protrusion height h is 0.5 mm to 7 mm, both inclusive, and the protrusion width w is 0.3 mm to 3 mm, both inclusive. Accordingly, the airflow S1 flowing toward the tire surface 31 in the direction substantially perpendicular thereto (downflow) collides heavily with the tire surface 31 at a position behind the radial protrusion 60 in the tire rotation direction. Accordingly, the airflow S1 and the tire surface 31 actively exchange heat with each other to further suppress the temperature rise in the tire side portions 30.

In the first embodiment, the extending-direction angle (θ) is set within a range of −70°≤θ≤70°. This makes the airflow S1 having a circumferential component cross multiple radial protrusions 60 easily. Consequently, the airflow S1 and the tire surface 31 actively exchange heat with other, further suppressing the temperature rise in the tire side portion 30.

In the first embodiment, the radial protrusions 60 are provided with a relation of 1.0≤p/h≤50. 0 and 1.0≤(p−w)/w≤100.0. This allows the airflow S1 and the tire surface 31 to actively exchange heat with each other, decreasing the temperature rise in the tire side portion 30 in a large area.

First Embodiment: Modification 1

In the first embodiment described above, the top face 64A of the high protrusion portion 64 and the top face 63A of the low protrusion portion 63 are continuous with each other with the inclined face 65. However, the following modifications can be made. The same portions as those of the pneumatic tire 1 according to the first embodiment described above are denoted by the same reference signs. Different portions are mainly described.

Figure 10:
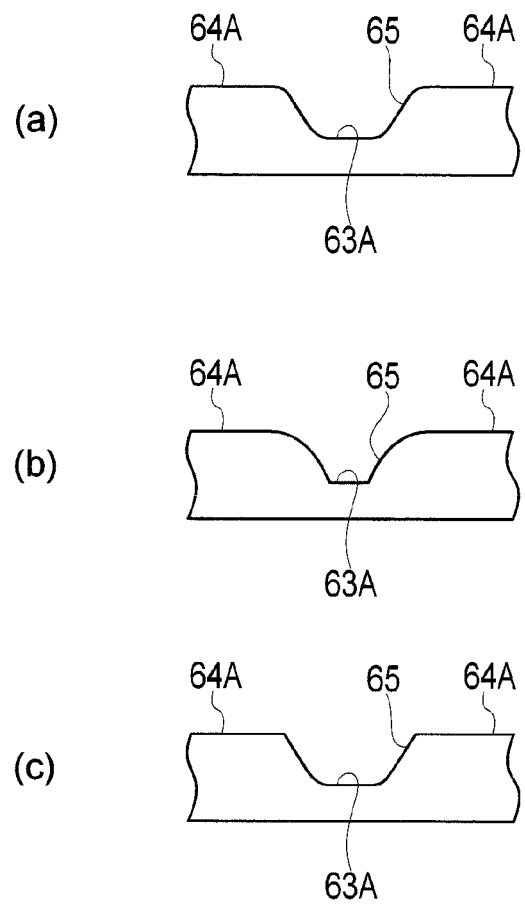
FIG. 10 shows enlarged side views of a radial protrusion according to Modification 1 of the first embodiment.

FIG. 10 shows enlarged side views of a radial protrusion according to Modification 1. As part (a) of FIG. 10(*a*) shows, each of the multiple radial protrusions 60 has inclined faces 65 each being continuous with the top face 64A of the high protrusion portion 64 and the top face 63A of the low protrusion portion 63. A border between the top face 64A of the high protrusion portion 64 and the inclined face 65 is round. A border between the top face 63A of the low protrusion portion 63 and the inclined face 65 is round.

The border between the top face 64A of the high protrusion portion 64 and the inclined face 65 and the border between the top face 63A of the low protrusion portion 63 and the inclined face 65 do not necessarily have to be round. For example, as part (b) of FIG. 10 shows, only the border between the top face 64A of the high protrusion portion 64 and the inclined face 65 may be round. As part (c) of FIG. 10 shows, only the border between the top face 63A of the low protrusion portion 63 and the inclined face 65 may be round.

First Embodiment: Modification 2

In the first embodiment described above, the top face 64A of the high protrusion portion 64 and the top face 63A of the low protrusion portion 63 are continuous with each other with the inclined face 65. However, the following modification can be made. The same portions as those of the pneumatic tire 1 according to the first embodiment described above are denoted by the same reference signs. Different portions are mainly described.

Figure 11:
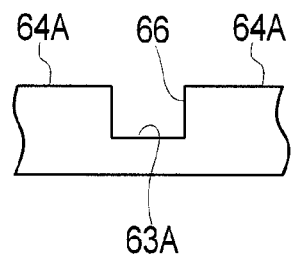
FIG. 11 shows enlarged side views of a radial protrusion according to Modification 2 of the first embodiment.

FIG. 11 is an enlarged side view of a radial protrusion according to Modification 2. As FIG. 11 shows, each of the multiple radial protrusions 60 has wall faces 66 each being continuous with the top face 64A of the high protrusion portion 64 and the top face 63A of the low protrusion portion 63. Each wall face 66 forms a substantially right angle with the top face 64A of the high protrusion portion 64 and with the top face 63A of the low protrusion portion 63.

First Embodiment: Modification 3

In the first embodiment described above, the border between the top face 60A and the end face 62A of the radial protrusion 60 is round. However, the following modification can be made. The same portions as those of the pneumatic tire 1 according to the first embodiment described above are denoted by the same reference signs. Different portions are mainly described.

Figure 12:
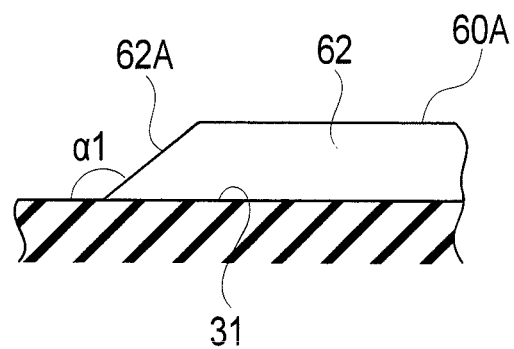
FIG. 12 is an enlarged side view of a radial protrusion according to Modification 3 of the first embodiment.

FIG. 12 is an enlarged side view of a radial protrusion according to Modification 3. As FIG. 12 shows, each of the multiple radial protrusions 60 has an end face 62A at its outer side in the tire radial direction. This end face 62A inclines (α1) with respect to the tire surface 31. The border between the top face 60A and the end face 62A of the radial protrusion 60 is not round.

First Embodiment: Modification 4

In the above description, the end face 62A of the outer end portion 62 according to the first embodiment inclines (α1) with respect to the tire surface 31. However, the following modification may be made. The same portions as those of the pneumatic tire 1 according to the first embodiment are denoted by the same reference signs. Different portions are mainly described.

Figure 13:
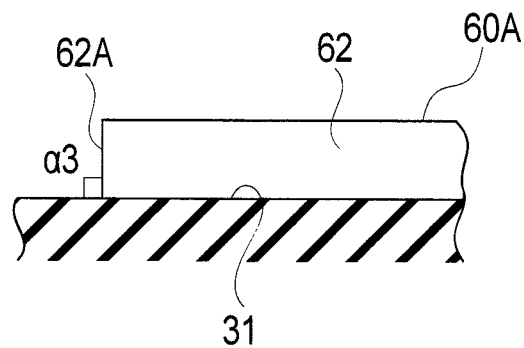
FIG. 13 is an enlarged side view of a radial protrusion according to Modification 4 of the first embodiment.

FIG. 13 is an enlarged side view of a radial protrusion according to Modification 4. As FIG. 13 shows, the outer end portion 62 has an end face 62A at an outer side thereof in the tire radial direction. This end face 62A forms a right angle (α3) with respect to the tire surface 31.

First Embodiment: Modification 5

In the above description, the protrusion width w according to the first embodiment is constant in the tire radial direction. However, the following modification may be made. The same portions as those of the pneumatic tire 1 according to the first embodiment are denoted by the same reference signs. Different portions are mainly described.

Figure 14:
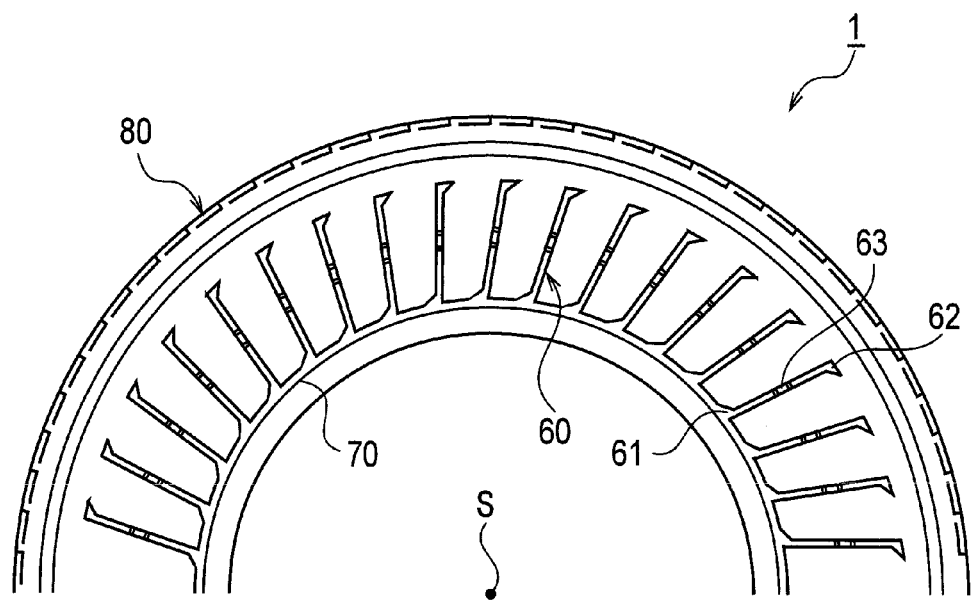
FIG. 14 is a side view of a pneumatic tire according to Modification 5 of the first embodiment.

FIG. 14 is a side view of a pneumatic tire according to Modification 5. As FIG. 14 shows, the protrusion width w is not constant in the tire radial direction.

Specifically, the width of the inner end portion 61 measured in the direction substantially perpendicular to the tire radial direction (to the extending direction of the protrusion) is larger than the radial-protrusion width w of the radial protrusion 60 located at its center portion in the tire radial direction. In addition, the width of the outer end portion 62 measured in the direction substantially perpendicular to the tire radial direction (to the extending direction of the protrusion) is larger than the radial-protrusion width w of the radial protrusion 60 located at its center portion in the tire radial direction.

The width of the low protrusion portion 63 measured in a direction substantially perpendicular to the tire radial direction does not have to be constant in the tire radial direction.

First Embodiment: Modification 6

In the above description, the radial-protrusions 60 according to the first embodiment extend straight in the tire radial direction. However, the following modification may be made. The same portions as those of the pneumatic tire 1 according to the first embodiment are denoted by the same reference signs. Different portions are mainly described.

Figure 15:
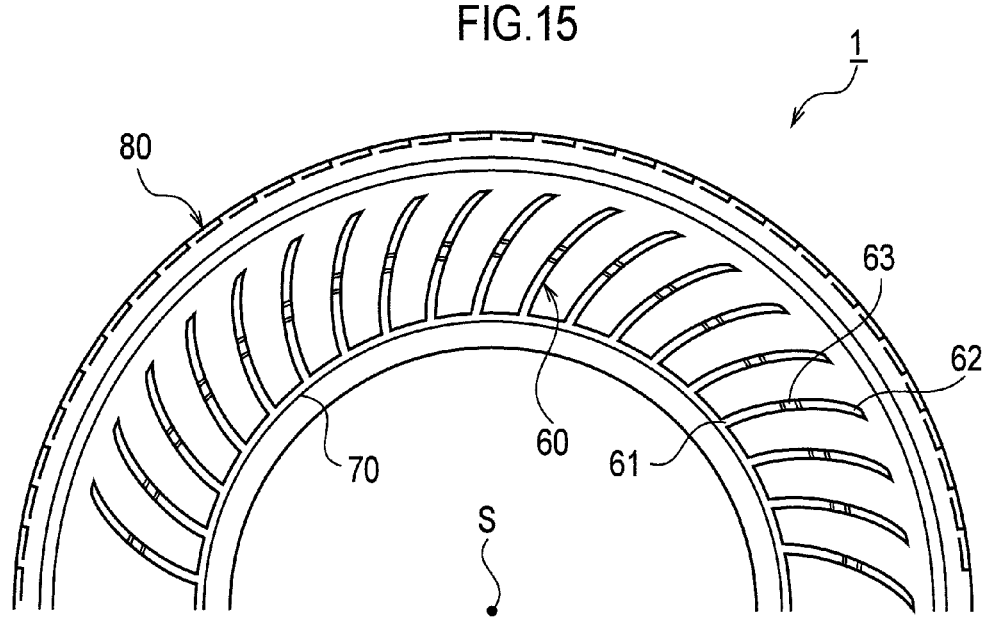
FIG. 15 is a side view of a pneumatic tire according to Modification 6 of the first embodiment.

FIG. 15 is a side view of a pneumatic tire according to Modification 6. As FIG. 15 shows, the radial protrusions 60 each curve with respect to the tire radial direction. In other words, the extending-direction angle (θ) largely changes from an inner side, in the tire radial direction, of the protrusion 60 to an outer side, in the tire radial direction, of the protrusion 60.

The extending-direction angle (θ) does not necessarily have to largely change from the inner side in the tire radial direction to the outer side in the tire radial direction. The extending-direction angle (θ) may slightly change from the inner side in the tire radial direction to the outer side in the tire radial direction.

[Second Embodiment]

Figure 16:
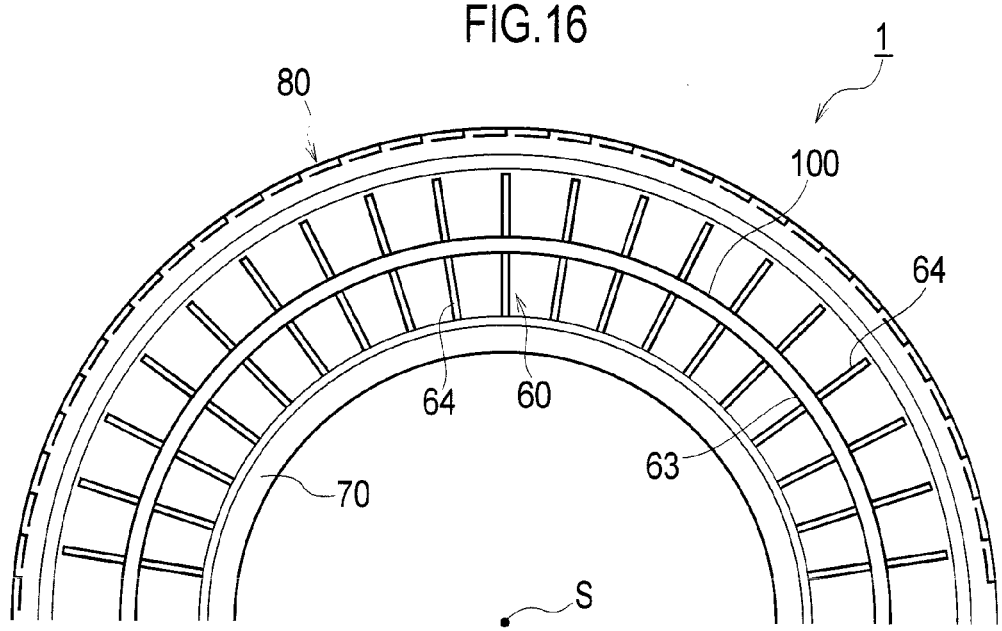
FIG. 16 is a partial side view of a pneumatic tire according to a second embodiment.
Figure 17:
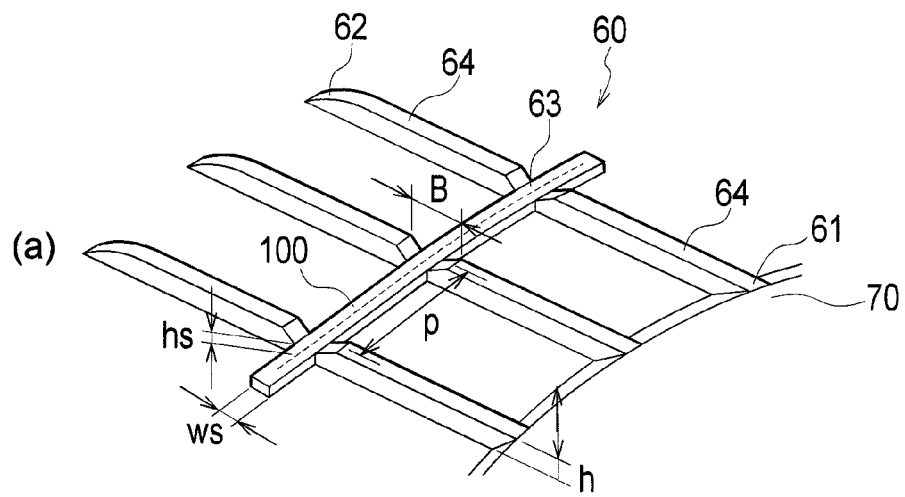
FIG. 17 is a diagram of a radial protrusion according to the second embodiment.
Figure 17:
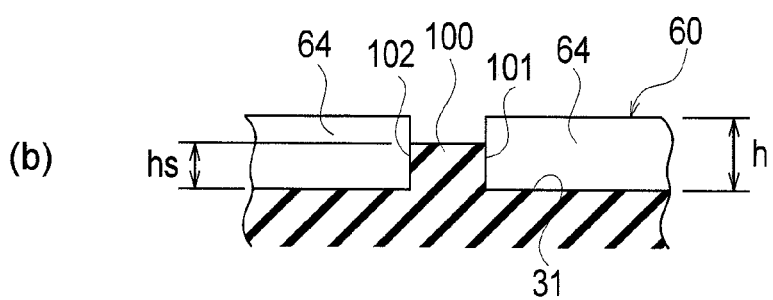

Hereinafter, the configuration of a pneumatic tire according to a second embodiment is described with reference to the drawings. FIG. 16 is a side view showing part of the pneumatic tire according to the second embodiment. FIG. 17 shows diagrams of radial protrusions according to the second embodiment. The same portions as those of the pneumatic tire 1 according to the first embodiment described above are denoted by the same reference signs. Different portions are mainly described.

As FIGS. 16 and 17 show, the pneumatic tire 1 includes not only the radial protrusions 60, but also a circular circumferential protrusion 100. The circular circumferential protrusion 100 extends along the circumference of a circle having the tire rotation axis S as the center, and has a shape protruding from the tire surface 31 outward in the tire width direction. Part of the circular circumferential protrusion 100 constitutes the low protrusion portion 63 of each of the multiple radial protrusions.

In other words, the height of the circular circumferential protrusion 100 measured in the tire width direction (hs') is almost equal to the low-protrusion height hs. In addition, the width ws of the circular circumferential protrusion substantially perpendicular to the tire circumferential direction (the extending direction of the protrusion) is almost equal to the length of the top face of the low protrusion portion 63 measured in the tire radial direction (the low-protrusion length B excluding the inclined faces 65).

As part (b) of FIG. 17 shows, the circular circumferential protrusion 100 is formed to be substantially quadrangular in a cross section taken in the direction substantially perpendicular to the tire circumferential direction (i.e., to the extending direction of the protrusion). Specifically, the circular circumferential protrusion 100 has an inner face 101 located on its inner side in the tire radial direction and an outer face 102 located on its outer side in the tire radial direction.

The inner face 101 forms an angle (α) of 90° (a right-angled face) with respect to the tire surface 31. In other words, the inner face 101 is continuous with the radial protrusion 60 while forming a right angle with respect to the tire surface. The outer face 102 forms an angle of 90° (a right-angled face) with respect to the tire surface 31. In other words, the outer face 102 is continuous with the radial protrusion 60 while forming a right angle with respect to the tire surface.

(Flow of Air)

Figure 18:
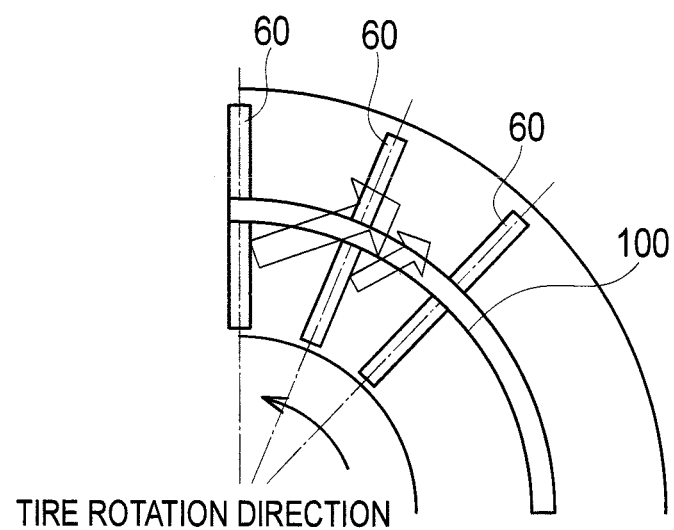
FIG. 18 is a diagram illustrating flow of air crossing over the radial protrusions 60 according to the second embodiment.

Next, flow of air crossing over the radial protrusions 60 according to the second embodiment is described with reference to a drawing. FIG. 18 is a diagram illustrating flow of air crossing over the radial protrusions 60 according to the second embodiment.

As FIG. 18 shows, the inner airflow is pulled by the outer airflow, and is directed outward in the radial direction by the centrifugal force. Airflow having crossed over the radial protrusion 60 and the circular circumferential protrusion 100 flows toward the tire surface 31 in the direction substantially perpendicular thereto at a position outward (downstream) of the radial protrusion 60 and the circular circumferential protrusion 100 in the tire radial direction (i.e., becomes downflow).

Consequently, the inner airflow having a large radial component (i.e., airflow flowing on the maximum width portion T) is not easily separated from the tire surface 31. In other words, the airflow flowing on the maximum width portion T is easily attached to the tire surface 31 at a position near the tire maximum width TW.

(Advantageous Effects)

In the second embodiment, the pneumatic tire 1 further includes the circular circumferential protrusion 100 extending in the circumferential direction. Part of the circular circumferential protrusion 100 constitutes the low protrusion portion 63. As in the first embodiment, this makes the inner airflow having a large radial component crossover the circular circumferential protrusion 100 more easily than in a case where the radial protrusion 60 has a constant height. The airflow having crossed over the circular circumferential protrusion 100 flows toward the tire surface 31 in the direction substantially perpendicular thereto at a position outward (downstream) of the circular circumferential protrusion 100 in the tire radial direction (i.e., becomes downflow).

Accordingly, the inner airflow having a large radial component is not easily separated from the tire surface 31. In other words, airflow flowing on the maximum width portion T is easily attached to the tire surface 31 at a position near the tire maximum width TW.

Consequently, airflow flowing on the maximum width portion T is further retained on the tire surface 31. Further, airflow caused by the circular circumferential protrusion 100 to flow in the perpendicular direction (downflow) increases. As a result, the airflow S1 and the tire surface 31 can actively exchange heat with each other.

Second Embodiment: Modification 1

In the above description, the circular circumferential protrusion 100 according to the second embodiment is formed to be substantially quadrangular in a cross section taken in the direction substantially perpendicular to the tire circumferential direction (i.e., to the extending direction of the protrusion). However, the following modification may be made. The same portions as those of the pneumatic tire 1 according to the second embodiment are denoted by the same reference signs. Different portions are mainly described.

Figure 19:
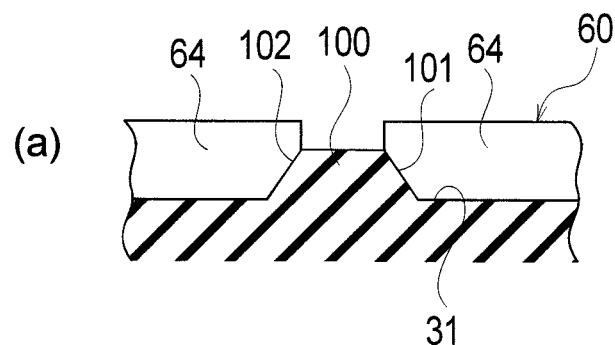
FIG. 19 shows enlarged side views of a circular circumferential protrusion (a low protrusion portion) according to Modification 1 of the second embodiment.
Figure 19:
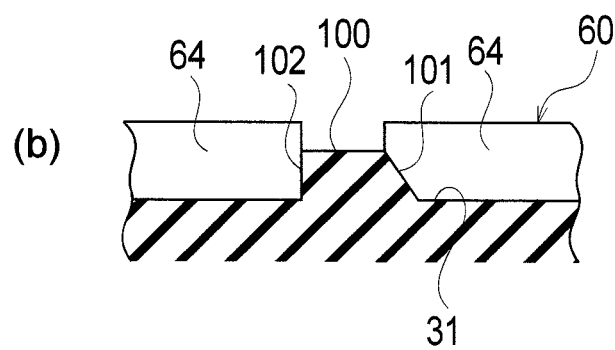
Figure 19:
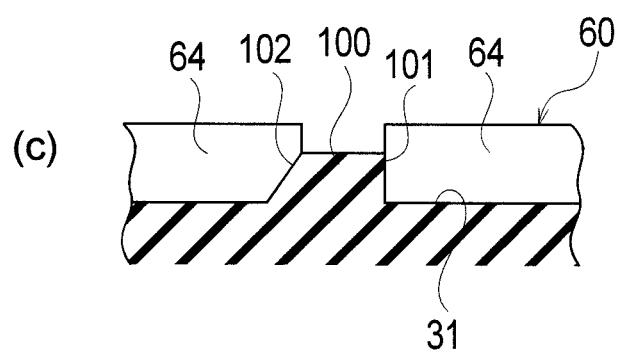

FIG. 19 shows enlarged side views of a radial protrusion according to Modification 1. As part (a) of FIG. 19 shows, the circular circumferential protrusion 100 is formed to be substantially trapezoidal in a cross section taken in the direction substantially perpendicular to the tire circumferential direction (i.e., to the extending direction of the protrusion).

Specifically, the inner face 101 forms an angle larger than 0° and smaller than 90° (an inclined face) with respect to the tire surface 31. In other words, the inner face 101 is continuous with the radial protrusion 60 while inclining with respect to the tire surface. The outer face 102 forms an angle larger than 0° and smaller than 90° (an inclined face) with respect to the tire surface 31. In other words, the outer face 102 is continuous with the radial protrusion 60 while inclining with respect to the tire surface.

The inner face 101 and the outer face 102 do not necessarily have to be an inclined face. For example, as part (b) of FIG. 19 shows, only the inner face 101 may incline with respect to the tire surface 31. As part (c) of FIG. 19 shows, only the outer face 102 may incline with respect to the tire surface 31.

Second Embodiment: Modification 2

In the second embodiment described above, the radial protrusion width w is constant in the tire circumferential direction. However, the following modification may be made. The same portions as those of the pneumatic tire 1 according to the second embodiment described above are denoted by the same reference signs. Different portions are mainly described.

Figure 20:
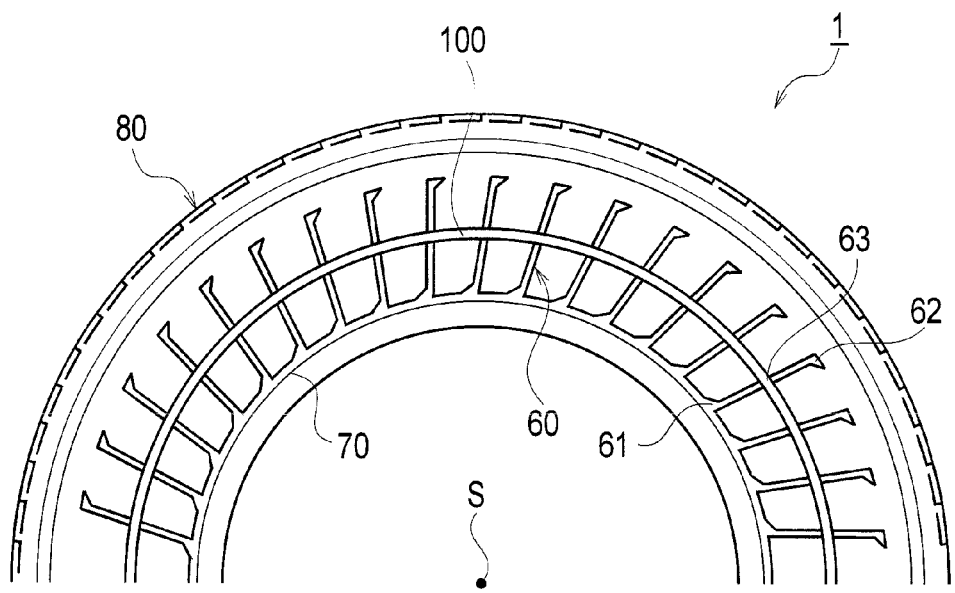
FIG. 20 is a side view of a pneumatic tire according to Modification 2 of the second embodiment.

FIG. 20 is a side view of a pneumatic tire according to Modification 2. As FIG. 20 shows, the radial protrusion width w is not constant in the tire radial direction.

Specifically, the width of the inner end portion 61 measured in a direction substantially perpendicular to the tire radial direction (to the extending direction of the protrusion) is larger than the radial protrusion width w of the radial protrusion 60 located at a middle portion between the inner end portion 61 and the maximum width portion T. In other words, the inner end portion 61 continues into the rim guard 70 by a large width.

The width of the outer end portion 62 measured in a direction substantially perpendicular to the tire radial direction (to the extending direction of the protrusion) is larger than the radial protrusion width w of the radial protrusion 60 located at the middle portion between the inner end portion 61 and the maximum width portion T. In other words, the outer end portion 62 continues into the tire surface 31 by a large width.

In the maximum width portion T, the width of the low protrusion portion 63 measured in a direction substantially perpendicular to the tire radial direction may be continuous with the circular circumferential protrusion 100 by a large width.

Second Embodiment: Modification 3

In the above description, the radial-protrusions 60 according to the second embodiment extend straight in the tire radial direction. However, the following modification may be made. The same portions as those of the pneumatic tire 1 according to the second embodiment are denoted by the same reference signs. Different portions are mainly described.

Figure 21:
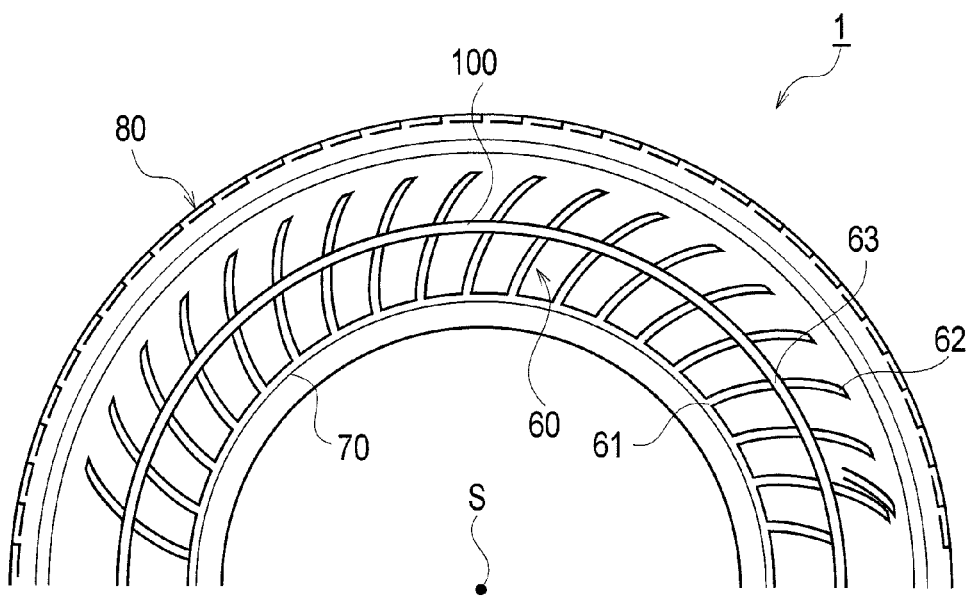
FIG. 21 is a side view of a pneumatic tire according to Modification 3 of the second embodiment.

FIG. 21 is a side view of a pneumatic tire according to Modification 3. As FIG. 21 shows, the radial protrusions 60 curve with respect to the tire radial direction. In other words, the extending-direction angle (θ) largely changes from an inner side, in the tire radial direction, of the protrusion 60 to an outer side, in the tire radial direction, of the protrusion 60.

The extending-direction angle (θ) does not necessarily have to largely change from the inner side in the tire radial direction to the outer side in the tire radial direction. The extending-direction angle (θ) may slightly change from the inner side in the tire radial direction to the outer side in the tire radial direction.

[Other Embodiments]

As described above, the details of the present invention have been disclosed by using the embodiments of the present invention. However, it should not be understood that the description and drawings which constitute part of this disclosure limit the present invention.

Specifically, in the above description, the inner end portions 61 of the multiple radial protrusions 60 smoothly continue into the rim guard 70. However, the present invention is not limited to such a case. The inner end portions 61 of the multiple radial protrusions 60 may be separated from the rim guard 70. In other words, the rim guard 70 does not necessarily have to be provided on the tire surface 31.

In the above descriptions, the angle formed between the inclined face 65 and the top face 63A of the low protrusion portion 63 is an obtuse angle (α2). However, the present invention is not limited to this case. For example, the angle formed between the inclined face 65 and the top face 63A of the low protrusion portion 63 may be an acute angle.

In the above description, the multiple radial protrusions 60 are each formed to be substantially quadrangular in a cross section taken in the direction substantially perpendicular to the tire radial direction (to the extending direction of the protrusions). However, the present invention is not limited to such a case. For example, the multiple radial protrusions 60 maybe formed to be substantially triangular or substantially trapezoidal.

Further, the height of the radial protrusion 60 (the protrusion height h) and the height of the circular circumferential protrusion 100 (the height of the circular circumferential protrusion 100 hs') do not necessarily have to be constant. For example, the heights h and hs each may be different on the inner side in the tire radial direction (the inner end portion 61 and the inner face 101) and on the outer side in the tire radial direction (the outer end portion 62 and the outer face 102).

In the above description, the pneumatic tire 1 has the side reinforcing layers 40 (namely, is a run-flat tire). However, the present invention is not limited to such a case. The pneumatic tire 1 does not have to have the side reinforcing layers 40.

From this disclosure, various alternative embodiments, examples, and operation techniques will be easily found by those skilled in the art. Accordingly, the technical scope of the present invention should be determined only by the matters to define the invention in the scope of claims regarded as appropriate based on the description.

EXAMPLES

Next, to further clarify the effects of the present invention, results of tests conducted using pneumatic tires according to Comparative Examples and Examples below are described. The present invention is not limited whatsoever by these examples. Data on each pneumatic tire are measured under the following conditions.

Tire Size: 285/50R20

Wheel Size: 8JJ×20

Internal Pressure Condition: 0 kPa (flat)

Load Condition: 9.8 kN

Speed Condition: 90 km/h

The configuration and a test result (durability) of each pneumatic tire are described with reference to Tables 1 to 3.

TABLE 1

| parameter | Comparative Example 1 | Comparative Example 2 | Comparative Example 3 |
|---|---|---|---|
| p/h | without protrusions | 15 | 15 |
| (p − w)/w | | 29 | 29 |
| w(mm) | | 2 | 2 |
| h(mm) | | 2 | 2 |
| hs(mm) | | 2 | 2 |
| hs/h (index) | | 1 | 1 |
| B(mm) | | — | — |
| continuous portion in circumferential direction | | — | — |
| durability(index) | 65 | 100 | 98 |

TABLE 2

| parameter | Example 1 | Example 2 | Example 3 | Example 4 | Example 5 |
|---|---|---|---|---|---|
| p/h | ← | ← | ← | ← | ← |
| (p − w)/w | ← | ← | ← | ← | ← |
| w(mm) | ← | ← | ← | ← | ← |
| h(mm) | ← | ← | ← | ← | ← |
| hs(mm) | 1.8 | 1.6 | 1.0 | 0.4 | 0.2 |
| hs/h (index) | 0.9 | 0.8 | 0.5 | 0.2 | 0.1 |
| B(mm) | 8 | ← | ← | ← | ← |
| continuous portion in circumferential direction | — | — | — | — | — |
| durability (index) | 100 | 103 | 105 | 102 | 100 |

TABLE 3

| parameter | Example 7 | Example 8 | Example 9 | Example 6 | Example 10 | Example 11 |
|---|---|---|---|---|---|---|
| p/h | ← | ← | ← | ← | ← | ← |
| (p − w)/w | ← | ← | ← | ← | ← | ← |
| w (mm) | ← | ← | ← | ← | ← | ← |
| h (mm) | ← | ← | ← | ← | ← | ← |
| hs (mm) | 1.0 | 1.0 | 1.0 | 1.0 | 1.0 | 1.0 |
| hs/h (index) | 0.5 | 0.5 | 0.5 | 0.5 | 0.5 | 0.5 |
| B (mm) | — | 2 | 3 | 8 | 20 | 22 |
| continuous portion in circumferential direction | present | ← | ← | ← | ← | ← |
| durability (index) | 107 | 107 | 108 | 110 | 108 | 107 |

As Table 1 shows, the pneumatic tire according to Comparative Example 1 does not include protrusions (the radial protrusions 60 and the circular circumferential protrusion 100) on a tire surface thereof. The pneumatic tire according to Comparative Example 2 includes radial protrusions having no low protrusion portions but only high protrusion portions. The pneumatic tire according to Comparative 3 includes radial protrusions each being divided at the point TWP corresponding to the tire maximum width TW.

As Table 2 shows, the pneumatic tires according to Examples 1 to 5 each include the radial protrusions 60 described in the first embodiment. As Table 3 shows, the pneumatic tires according to Examples 6 to 11 each include not only the radial protrusions 60, but also the circular circumferential protrusion 100 described in the second embodiment.

<Durability>

Each pneumatic tire was mounted on a test drum and was run until the pneumatic tire broke (e.g., until a separation occurred near the side reinforcing layers). The durability distance is thus measured and then expressed as an index number. Using the durability of the pneumatic tire according to Comparative Example 2 as the reference of 100, the durability of each of the other pneumatic tires was evaluated. The larger the numeric value, the better the durability.

The results show that the pneumatic tires according to Examples 1 to 11 have a higher effect of radiating the heat of the tire side portions and therefore have better durability than the pneumatic tires according to Comparative Examples 1 to 3.

Especially, the pneumatic tire having the low-protrusion height hs of 0.2 times to 0.8 times, both inclusive, of the high-protrusion height h and the pneumatic tire having the low-protrusion length B of 2 mm to 22 mm, both inclusive, were found to have a better effect of radiating the heat of the tire side portions. Further, the pneumatic tires provided with not only the radial protrusions 60 but also the circular circumferential protrusion 100 were found to have an even better effect of radiating the heat of the tire side portions.

Figure 22:
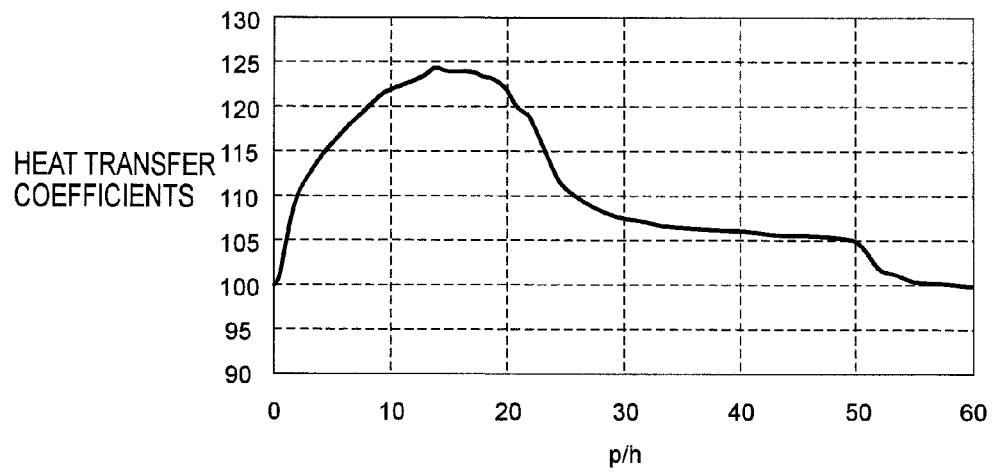
FIG. 22 is a graph showing heat transfer coefficients of a pneumatic tire of Example (part 1).
Figure 23:
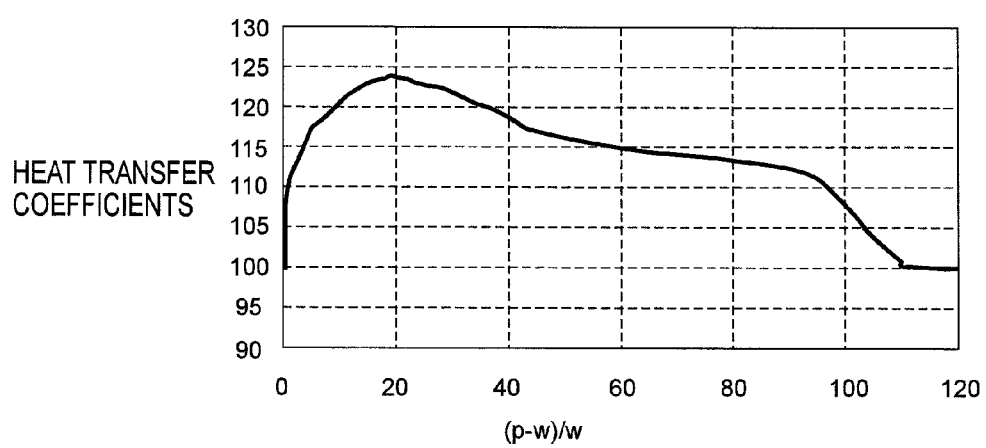
FIG. 23 is a graph showing heat transfer coefficients of a pneumatic tire of Example (part 2).
Figure 24:
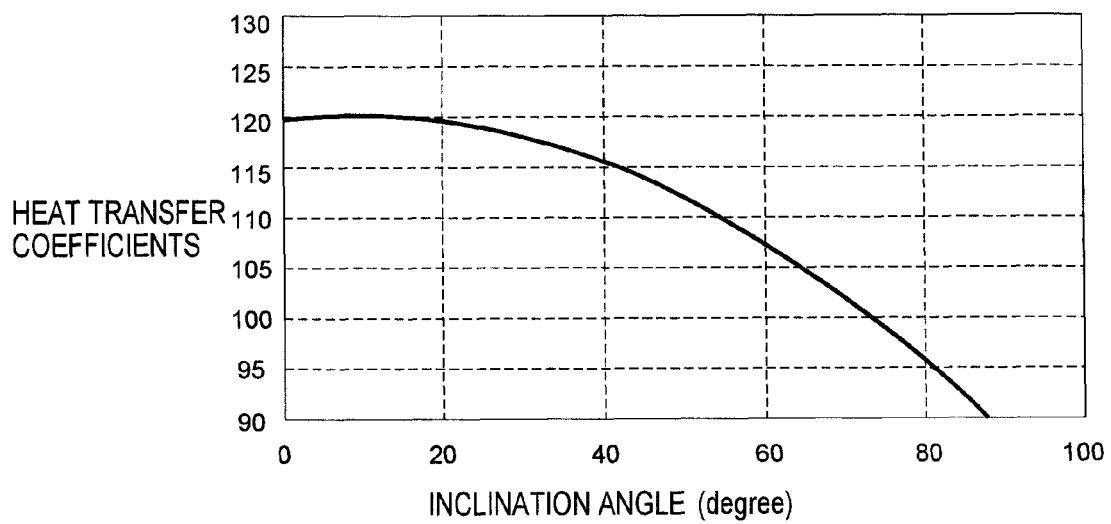
FIG. 24 is a graph showing heat transfer coefficients of a pneumatic tire of Example (part 3).

Next, FIGS. 22 to 24 show results of durability tests conducted while changing p/h, (p−w)/w, and the extending-direction angle (θ) of the turbulence generating protrusions. The vertical axis of the graph in each of FIGS. 22 to 24 indicates a heat transfer coefficient. Here, the heat transfer coefficient was obtained by: applying a constant voltage to a heater to generate a certain amount of heat; blowing the heat with a blower, and measuring the temperature of the tire surface and the amount of air blown. Accordingly, the larger the heat transfer coefficient, the higher the radiation effect of the tire side portion, namely, the better the durability. Here, the heat transfer coefficient of the pneumatic tire which is not provided with either the radial protrusions 60 or the circular circumferential protrusion 100 (Comparative Example 1 described above) is set to "100". The heat transfer coefficient measuring tests were conducted under the following conditions.

Tire Size: 285/50R20
Wheel Size: 8JJ×20
Internal Pressure Condition: 0 kPa (flat)
Load Condition: 0.5 kN
Speed Condition: 90 km/h As FIG. 22 shows, the heat transfer coefficient is high when the ratio of the pitch P of the radial protrusions to the high-protrusion height h (p/h) is 1.0 to 50.0, both inclusive. When p/h is 2.0 to 24.0, the heat transfer coefficient is even higher. This shows that the radial protrusions should be provided with a relation of $1.0 \leq p/h \leq 50.0$. The graph shows that it is particularly preferable to provide the radial protrusions with a relation of $2.0 \leq p/h \leq 24.0$, or even more preferably, with a relation of $10.0 \leq p/h \leq 20.0$.

FIG. 23 shows that, based on the relation between (p−w)/w and the heat transfer coefficient (measured in the same manner as that for the above heat transfer coefficient), the radial protrusions should be provided with a relation of $1.0 \leq (p-w)/w \leq 100.0$. The graph shows that it is particularly preferable to provide the radial protrusions with a relation of $4.0 \leq (p-w)/w \leq 39.0$.

FIG. 24 shows that it is preferable to provide the radial protrusions so that the extending direction angle (θ) may be within a range of 0 to 70°. Note that similar heat transfer coefficient should be obtained even when the extending direction angle (θ) is set within a range of 0 to −70°.

Note that the entire content of Japanese Patent Application No. 2008-132255 (filed on May 20, 2008) is incorporated herein by reference.

[Industrial Applicability]

As described above, the pneumatic tire according to the present invention can sufficiently suppress the temperature rise in the tire side potions, and is therefore useful in a technique for manufacturing pneumatic tires, and the like.

[Reference Signs List]

1 ... pneumatic tire, 10 ... bead portion, 10a ... bead core, 10b ... bead filler, 20 ... carcass layer, 30 ... tire side portion, 31 ... tire surface, 40 ... side reinforcing layer, 50 ... inner liner, 60 ... radial protrusion, 61 ... inner end portion, 62 ... outer end portion, 62A ... end face, 63 ... low protrusion portion, 63A ... top face of low protrusion portion, 64 ... high protrusion portion, 64A ... top face of high protrusion portion, 65 ... inclined face, 66 ... wall face, 70 ... rim guard, 80 ... tread portion, 81 ... tread shoulder, 90A ... first belt layer, 90B . . . second belt layer, 100 . . . circular circumferential protrusion, 101 . . . inner face, 102 . . . outer face

The invention claimed is:

1. A pneumatic tire comprising a plurality of radial protrusions each extending in a tire radial direction on a tire surface and having a shape protruding from the tire surface outward in a tire width direction, wherein the plurality of radial protrusions are provided radially with a tire rotation axis as a center, the plurality of radial protrusions each have a low protrusion portion and more than one high protrusion portion, and a height of the low protrusion portion measured in the tire width direction is lower than a maximum height of the high protrusion portions measured in the tire width direction, wherein the low protrusion portion is positioned in between a first high protrusion portion and a second high protrusion portion in the tire radial direction, wherein the height of the low protrusion portion measured in the tire width direction is 0.2 times to 0.8 times, both inclusive, of the maximum height of the high protrusion portions measured in the tire width direction, wherein the low protrusion portion is provided to the tire surface in a tire maximum width portion in the tire width direction, and wherein the pneumatic tire further comprises a circular circumferential protrusion extending along a circumference which has the tire rotation axis as a center, and having a shape protruding from the tire surface outward in the tire width direction, wherein part of the circular circumferential protrusion constitutes the low protrusion portion of each of the plurality of radial protrusions.

2. The pneumatic tire according to claim 1, wherein a length of the low protrusion portion measured in the tire radial direction is 2 mm to 22 mm, both inclusive.

3. The pneumatic tire according to claim 1, wherein each of the plurality of radial protrusions has inclined faces each being continuous with a top face of the high protrusion portions and with a top face of the low protrusion portion, and an angle formed between the inclined face and the top face of the low protrusion portion is an obtuse angle.

4. The pneumatic tire according to claim 3, wherein each of the plurality of radial protrusions has inclined faces each being continuous with a top face of the high protrusion portions and with a top face of the low protrusion portion, and a border between the top face of the high protrusion portions and the inclined face is round.

5. The pneumatic tire according to claim 3, wherein each of the plurality of radial protrusions has inclined faces each being continuous with a top face of the high protrusion portions and with a top face of the low protrusion portion, and a border between the top face of the low protrusion portion and the inclined face is round.

6. The pneumatic tire according to claim 1, wherein each of the plurality of radial protrusions has wall faces each being continuous with a top face of the high protrusion portions and with a top face of the low protrusion portion, and the wall face forms a substantially right angle with respect to the top face of the high protrusion portions and to the top face of the low protrusion portion.

7. A pneumatic tire comprising a plurality of radial protrusions each extending in a tire radial direction on a tire surface and having a shape protruding from the tire surface outward in a tire width direction, wherein the plurality of radial protrusions are provided radially with a tire rotation axis as a center, the plurality of radial protrusions each have a low protrusion portion and more than one high protrusion portion, and a height of the low protrusion portion measured in the tire width direction is lower than a maximum height of the high protrusion portions measured in the tire width direction, wherein the low protrusion portion is positioned in between a first high protrusion portion and a second high protrusion portion in the tire radial direction, wherein the height of the low protrusion portion measured in the tire width direction is 0.2 times to 0.8 times, both inclusive, of the maximum height of the high protrusion portions measured in the tire width direction, wherein the low protrusion portion is provided to the tire surface in a tire maximum width portion in the tire width direction wherein the plurality of radial protrusions have a relation of $1.0 \leq p/h \leq 50.0$ and $1.0 \leq (p-w)/w \leq 100.0$, where "h" is a maximum height of the high protrusion portions, "w" is a width of each radial protrusion measured in a direction perpendicular to the tire radial direction, and "p" is a pitch between the adjacent radial protrusions.

* * * * *